United States Patent
Leach et al.

(10) Patent No.: US 8,677,761 B2
(45) Date of Patent: Mar. 25, 2014

(54) SYSTEMS AND METHODS FOR ENGINE TURN DOWN BY CONTROLLING EXTRACTION AIR FLOWS

(75) Inventors: David Leach, Simpsonville, SC (US); Jason Nathaniel Cook, Greenville, SC (US); Chi Ming Ho, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 1019 days.

(21) Appl. No.: 12/392,526

(22) Filed: Feb. 25, 2009

(65) Prior Publication Data
US 2010/0215480 A1  Aug. 26, 2010

(51) Int. Cl.
*F02C 9/18* (2006.01)
(52) U.S. Cl.
USPC .............. 60/779; 60/39.091; 60/782; 60/785; 60/806
(58) Field of Classification Search
USPC ................... 60/772, 782, 785, 795, 806, 779, 60/39.091
See application file for complete search history.

(56) References Cited

U.S. PATENT DOCUMENTS

| | | | |
|---|---|---|---|
| 6,385,958 B2 | 5/2002 | Leone et al. | |
| 6,393,825 B1 | 5/2002 | Leone et al. | |
| 6,779,346 B2 * | 8/2004 | Nichols et al. | 60/782 |
| 7,152,409 B2 * | 12/2006 | Yee et al. | 60/777 |
| 8,015,826 B2 * | 9/2011 | Myers et al. | 60/785 |
| 2004/0206901 A1 | 10/2004 | Chen et al. | |
| 2007/0074516 A1 * | 4/2007 | Peck et al. | 60/772 |
| 2007/0151257 A1 | 7/2007 | Maier et al. | |
| 2010/0175387 A1 | 7/2010 | Foust et al. | |

FOREIGN PATENT DOCUMENTS

| | | |
|---|---|---|
| CN | 1944985 A | 4/2007 |
| EP | 1387062 A2 | 2/2004 |
| EP | 1770331 A2 | 4/2007 |
| JP | S61187538 A | 8/1986 |
| JP | H05171958 A | 7/1993 |
| JP | 2001207864 A | 8/2001 |
| JP | 2002366389 A | 12/2002 |

(Continued)

OTHER PUBLICATIONS

EP10154131.6, European Search Report and Written Opinion, Dec. 16, 2010.

(Continued)

*Primary Examiner* — Phutthiwat Wongwian
*Assistant Examiner* — Steven Sutherland
(74) *Attorney, Agent, or Firm* — Sutherland Asbill & Brennan LLP

(57) ABSTRACT

Systems and methods for controlling compressor extraction air flows from a compressor of a turbine system during engine turn down are provided. In one embodiment, a method for controlling compressor extraction air flows from a compressor of a turbine system during turn down includes a control unit monitoring one or more operating parameters of a turbine system associated with an exit temperature of a combustor of the turbine system. The method further includes the control unit detecting one or more operating parameters meeting or exceeding a threshold associated with a decrease in the exit temperature of the combustor. In response to detecting one or more operating parameter meeting or exceeding the threshold, a control signal is transmitted to at least one variable orifice located in the turbine system causing at least one variable orifice to alter at least one extraction air flow from the compressor.

18 Claims, 2 Drawing Sheets

(56) References Cited

FOREIGN PATENT DOCUMENTS

| | | |
|---|---|---|
| JP | 2004163087 A | 6/2004 |
| JP | 2004211641 A | 7/2004 |
| JP | 2005105951 A | 4/2005 |
| JP | 2006285736 A | 10/2006 |
| JP | 2007182883 A | 7/2007 |
| JP | 2007205215 A | 8/2007 |
| WO | 2008123904 A2 | 10/2008 |

OTHER PUBLICATIONS

Office Action and Search report from CN Application No. 201010135868.4 dated Jul. 15, 2013.

Office Action from the Japan Patent Office for Japanese Application No. 2010-033079 dated Dec. 3, 2013.

* cited by examiner

SYSTEMS AND METHODS FOR ENGINE TURN DOWN BY CONTROLLING EXTRACTION AIR FLOWS

FIELD OF THE INVENTION

The invention relates generally to rotary machines, and more particularly, to systems and methods for controlling compressor extraction air flows during engine turn down.

BACKGROUND OF THE INVENTION

Many known combustion turbine engines burn a hydrocarbon-air mixture in a combustor assembly and generate a combustion gas stream that is channeled to a turbine assembly. The turbine assembly converts the energy of the combustion gas stream to torque that may be used to power a machine, for example, an electric generator or a pump. The combustion gas stream temperature prior to the first stage nozzle is referred to as the combustor exit temperature. A common range of combustion gas stream temperatures may be approximately 2400° F. to 2600° F.

Typically, when a turbine is operated at a relatively high load, the combustor exit temperature is high and carbon monoxide (CO) and/or unburned hydrocarbon (UHC) emissions are held to a minimum. However, when the combustion process is not fully completed, high levels of CO and/or UHC may exist in the turbine exhaust system. High CO and/or UHC emission levels are prohibited by regulatory agencies.

In typical combustion turbine engines, the ability of the hydrocarbon fuel to completely combust is limited by a lower limit on the combustor exit temperature. As the turbine load decreases (often referred to as "turn down"), it is necessary, in many gas turbines, to reduce the combustor exit temperature, and the lower temperature limit can be violated, which may result in increased levels of CO and UHC being formed. What is needed is a way to maintain high combustor temperatures to prevent an increase in CO and/or UHC emissions to unacceptable levels when a turbine engine reduces load.

BRIEF DESCRIPTION OF THE INVENTION

Some or all of the above needs and/or problems may be addressed by certain embodiments of the invention. According to one embodiment of the invention, there is disclosed a method for controlling compressor extraction air flows from a compressor of a turbine system during engine turn down. The method includes a control unit monitoring one or more operating parameters of a turbine system associated with an exit temperature of a combustor of the turbine system. The method further includes the control unit detecting one or more operating parameters meeting or exceeding (e.g., rising above or falling below) a threshold associated with a decrease in the exit temperature of the combustor. In response to detecting one or more operating parameters meeting or exceeding the threshold, a control signal is transmitted to at least one variable orifice located in the turbine system causing at least one variable orifice to alter at least one extraction air flow from the compressor.

In accordance with another embodiment of the invention, there is disclosed a control system for controlling compressor extraction air flows from a compressor of a turbine system during engine turn down that includes a plurality of sensors located in a turbine system in communication with a control unit processor. The control unit processor is configured to execute computer-implemented instructions to monitor one or more operating parameters of a turbine system associated with an exit temperature of a combustor of the turbine system. The control unit processor is further configured to execute computer-implemented instructions to detect one or more operating parameters meeting or exceeding a threshold associated with a decrease in the exit temperature of the combustor, and in response, transmit a control signal to at least one variable orifice located in the turbine system causing at least one variable orifice to alter at least one extraction air flow from the compressor.

Other systems and methods according to various embodiments of the invention will become apparent with respect to the remainder of this document.

BRIEF DESCRIPTION OF DRAWINGS

Figure 1:
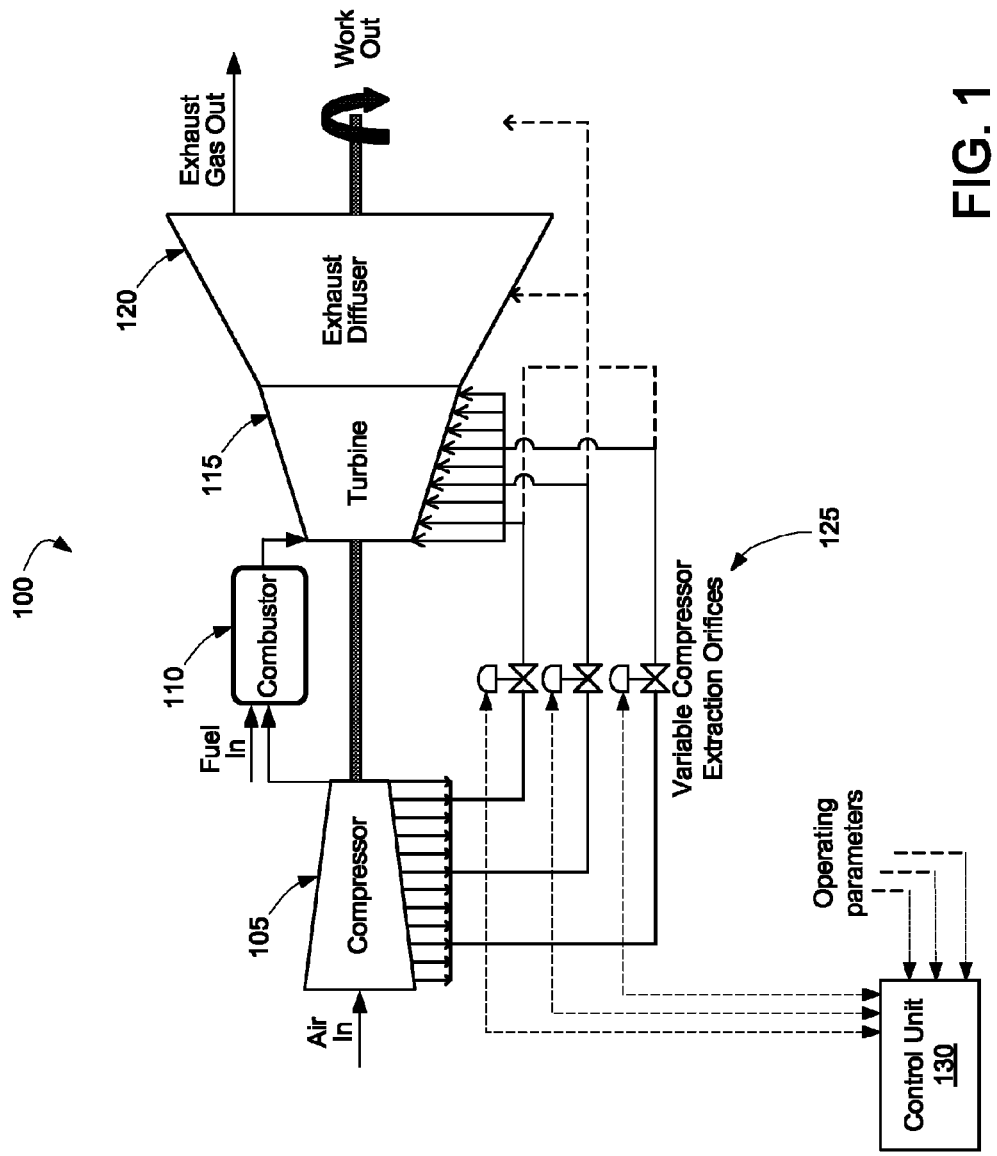

Having thus described the invention in general terms, reference will now be made to the accompanying drawings, which are not necessarily drawn to scale, and wherein:

FIG. 1 illustrates an example turbine system for controlling compressor extraction air flows from a compressor of a turbine system during engine turn down in accordance with an example embodiment of the invention.

Figure 2:
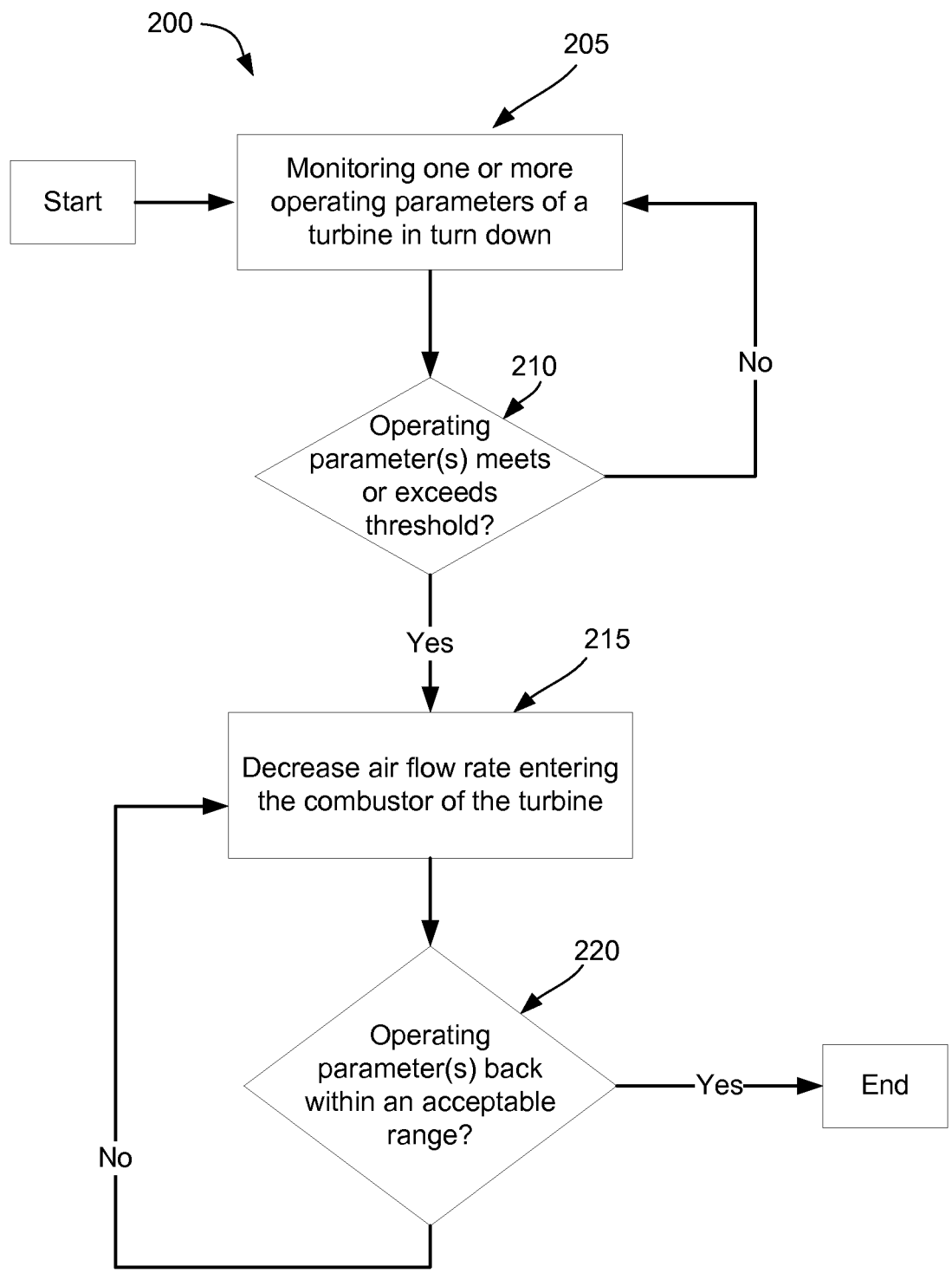

FIG. 2 illustrates an example flowchart for controlling compressor extraction air flows from a compressor of a turbine system during engine turn down in accordance with an example embodiment of the invention.

DETAILED DESCRIPTION OF THE INVENTION

According to example embodiments of the invention, systems and methods are provided that utilize variable compressor extraction flows for the purpose of improving turn down capability of a combustion turbine engine. Some example embodiments of the invention utilize existing compressor extraction piping with a variable orifice (controlled by one or more operating characteristics or operating parameters of the combustion turbine) to create variable compressor extraction flows that achieve improved turn down capability. Variable compressor extraction flows (via one or more variable compressor extraction orifices) may be provided in any compressor stage of a turbine system and may be controlled during load reduction in order to maintain a suitable fuel/air ratio to meet desired combustor operating parameters.

In some embodiments of the invention, compressor air is bypassed around a primary combustion zone in order to operate at minimum load while keeping CO and UHC emission levels sufficiently low. In accordance with some example embodiments of the invention, the controlled compressor extraction flows may be reinstated to any component in any stage of the turbine, bled to the turbine exhaust diffuser, or bled to atmosphere (e.g., overboard). Moreover, variable compressor extraction air flows may improve not only turn down capability for the turbine system, but may also improve fuel consumption of the turbine system operating at any given load level.

Embodiments of the invention are described below with reference to block diagrams of systems, methods, apparatuses and computer program products according to an embodiment of the invention. Example embodiments of the invention are more fully described hereinafter with reference to the accompanying drawings, in which like numerals indicate like elements throughout the several drawings. Indeed, this invention may be embodied in many different forms and should not be construed as limited to the embodiments set forth herein; rather, these embodiments are provided so that this disclosure will satisfy applicable legal requirements.

FIG. 1 illustrates an example turbine system 100 for controlling compressor extraction air flows from a compressor of a turbine system 100 during engine turn down in accordance with an embodiment of the invention. The example turbine system 100 shown in FIG. 1 may be a gas turbine used for powering, for example, an electric generator (not shown). As shown in the example embodiment of FIG. 1, the turbine system 100 includes a compressor 105 having an inlet for receiving and compressing air, which is discharged from an outlet of the compressor 105 at maximum pressure. In an example embodiment of the invention, the compressor 105 may be an axial compressor having alternating rows of stator vanes and rotor blades arranged in a plurality of stages for sequentially compressing the air with each succeeding downstream stage increasing the pressure higher and higher until the air is discharged from the compressor outlet at a maximum pressure.

A combustor 110 receives the compressed outlet air from the compressor outlet. Fuel supply conduits and injectors (not shown) may be further provided for mixing a suitable fuel with the compressed outlet air for undergoing combustion in the combustor 110 to generate hot combustion gases. Disposed downstream from the combustor 110, in flow communication therewith, is a turbine section 115 where the energy of the hot gases is converted into work. In the turbine section 115, the hot gases are expanded, and a portion of the thermal energy is converted into kinetic energy of the turbine. A portion of the kinetic energy is transferred to rotating buckets and converted to work. In some embodiments of the invention, a portion of the work developed by the turbine may be used to drive the compressor 105 whereas the remainder is available for generating power. The turbine section 115 may include various components that are heated by the combustion gases, including stator nozzles or vanes and rotor blades that may be arranged in a plurality of stages therein. As shown in the example embodiment of FIG. 1, the turbine section 115 is connected to an exhaust diffuser 120. The exhaust diffuser 120 converts the incoming kinetic energy from the turbine section 115 into a pressure rise and releases it at an ambient pressure.

The illustrated embodiment of FIG. 1 includes extraction conduits (or paths) disposed in flow communication with an extraction point or stage of the compressor 105 for bleeding a portion of the compressed air as cooling or bleed air at a corresponding extraction pressure. In some example embodiments of the invention, the extraction conduits may be located in stage 9 and/or stage 13 of the compressor 105. In accordance with some example embodiments of the invention, the controlled compressor extraction flows may be reinstated to any component in any stage of the turbine system 100. For example, the compressor extraction flows may be bled to the turbine exhaust diffuser 120. In another example, the compressor extraction flows may be bled to the atmosphere. When the compressor extraction air is reintroduced to the turbine system 100, the deficit to the heat rate may be limited, and the overall fuel consumption at a given ambient temperature may be decreased.

The compressor extraction flows shown in the example embodiment of FIG. 1 may be controlled during load reduction in order to maintain a suitable combustor exit temperature and CO and UHC emissions levels. Moreover, the utilization of variable compressor extraction flow to by-pass the primary combustion zone during load reduction may result in a decrease in the mass flow rate of air entering the combustor 110 which in turn results in a higher combustor exit temperature and lower CO and UHC emission levels. Increasing the compressor extraction flow(s) during load reduction results in further decreasing the mass flow rate of air entering the combustor, which in turn results in a higher combustor exit temperature and lower CO and UHC emission levels. To allow for control of compressor extraction flows during load reduction, the compressor air extraction conduits are connected to one or more variable compressor extraction orifices 125. As shown in the illustrated embodiment of FIG. 1, from the variable compressor extraction orifices 125, conduits direct the air to the turbine section 115 and/or exhaust diffuser 120.

In example embodiments of the invention, the variable compressor extraction orifices 125 may be comprised of one or more variable geometric orifices. The geometry of each orifice may be controlled in accordance with one or more operating parameters of the combustion turbine, e.g., firing temperature, in order to control the compressor extraction flows to maintain a certain combustor exit temperature and/or CO and UHC emission levels throughout load reduction. In example embodiments of the invention, the variable compressor extraction orifices 125 may be located in extraction piping associated with the compressor 105, located in at least one stage of the compressor 105, or located elsewhere in the turbine system 100. In an example embodiment of the invention, one or more variable orifices may be operated to define a low flow orifice and/or operated to define a high flow orifice. The variable orifice may be controlled by a control unit 130. An example variable orifice may be a valve (e.g., a hydraulic globe valve, pneumatic valve, gate valve, etc.), where the stroke of the valve may be controlled by the control unit in accordance with one or more operating parameters of the combustion turbine, e.g. firing temperature, in order to maintain a certain combustor exit temperature and/or CO and UHC emission levels throughout load reduction.

The control unit 130 may perform many functions including fuel; air and emissions control; sequencing of turbine fuel and auxiliary for start-up, shut-down and cool-down; synchronization and voltage matching of generator and system; monitoring of all turbine, control and auxiliary functions; and protection against unsafe and adverse operating parameters. In some example embodiments of the invention, the control unit 130 operations for controlling compressor extraction air flows from a compressor 105 of a turbine system 100 during engine turn down may be incorporated into existing multi-parameter control systems (e.g., existing model-based control (MBC) systems or corrected parameter control (CPC) control systems). In an example embodiment of the invention, the control unit 130 for a gas turbine system may be a component and/or module incorporated into existing turbine control systems such as, but not limited to, the General Electric Co.'s Speedtronic™ Mark VI Control System.

As shown in FIG. 1, example embodiments of the invention utilize an integrated control unit 130 to provide active modulation of compressor extraction flows during load reduction by controlling one or more variable compressor extraction orifices 125 in order to maintain a suitable fuel/air ratio to meet desired combustor 110 operations and/or turbine emission levels. The control unit 130 is capable of controlling compressor extraction flows in response to one or more measured or calculated operating parameters of various components of the turbine system 100. In accordance with an exemplary embodiment of the invention, one or more operating parameters of the turbine system 100 utilized by the control unit 130 may be monitored by the control unit 130 with suitable sensors disposed in one or more locations in the turbine system 100 measuring one or more operating parameters. In example embodiments of the invention, the sensors may be placed throughout various components and/or stages of the turbine system 100 including the compressor 105, the combustor 110, the turbine section 115, the exhaust diffuser 120, the variable compressor extraction orifice(s) 125, etc.

In example embodiments of the invention, the sensors disposed in one or more locations in the turbine system 100 may be used to monitor, measure, calculate, or otherwise obtain operating parameter data. In some example embodiments of the invention, sensors in the turbine system used in closed loop control systems and/or sensors used to obtain operating data for firing temperature calculations may be used in monitor operating parameters to allow the control unit 130 to modulate compressor extraction flows to maintain suitable fuel/air ratios to meet desired combustor 110 operations and/or maintain acceptable turbine emission levels during load reduction.

One or more of the turbine system 100 operating parameters may be processed by the control unit 130 to determine settings for controllable parameters to maintain a suitable combustor exit temperature and CO and UHC emissions levels during load reduction. Such operating parameters may include exhaust temperature and/or pressure, compressor airflow, compressor inlet and/or outlet temperatures and pressures, fuel flow, carbon monoxide, combustion dynamics, distribution and intake airflow, etc. In some example embodiments of the invention, the control unit 130 may calculate one or more operating parameters (e.g., combustor exit temperature, turbine reference temperature, turbine firing temperature, etc.) for use in controlling the variable compressor extraction orifice(s) 125 to maintain a suitable combustor exit temperature and CO and UHC emission levels during load reduction.

The turbine system 100 shown in and described with respect to FIG. 1 is provided by way of example only. Numerous other turbine system operating environments, architectures, and/or configurations are possible. Accordingly, embodiments of the invention should not be construed as being limited to any particular operating environment, architecture, or configuration shown in and described with respect to FIG. 1. A more detailed description of the operations for controlling compressor extraction air flows from a compressor of a turbine system 100 during engine turn down is provided below with reference to FIG. 2.

FIG. 2 illustrates an example flowchart for controlling compressor extraction air flows from a compressor of a turbine system during engine turn down in accordance with an embodiment of the invention. It will be understood that one or more blocks and/or combinations of blocks in FIG. 2 can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functionality of each block of the block diagrams, or combinations of blocks in the block diagrams discussed in detail in the descriptions below. These computer program instructions may also be stored in a computer-readable memory that can direct a computer or other programmable data processing apparatus to function in a particular manner including implementing the functions specified in the block or blocks. Embodiments of the invention may also be implemented through an application program running on an operating system of a computer. In addition, or in the alternative, the application program (in whole or in part) may be located in remote memory or in storage to allow for the practice of embodiments of the invention where tasks are performed by remote processing devices linked through a communications network.

It will also be understood that each block and/or combinations of blocks in FIG. 2 can be implemented by special purpose hardware-based computer systems that perform the specified functions or elements, or combinations of special purpose hardware and computer instructions. These embodiments also may be practiced with other computer system configurations, including hand-held devices, multiprocessor systems, microprocessor based or programmable consumer electronics, mini-computers, mainframe computers, etc.

As shown in FIG. 2, the example process 200 begins in block 205, where one or more operating parameters of the turbine system associated with an exit temperature of a combustor of the turbine and/or CO or UHC emission levels of the turbine are monitored by a control unit. In example embodiments of the invention, the use of sensors allows for a variety of measured or calculated operating parameters to be monitored by the control unit. In an example embodiment of the invention, the monitoring may be of one or more sensors located in the turbine system. In example embodiments of the invention, such monitoring of operating parameters may include measuring one or more of various turbine system measurements including exhaust temperature, compressor airflow, compressor discharge temperature, compressor discharge pressure, fuel flow, carbon monoxide, combustion dynamics, etc. In other embodiments of the invention, the operating parameters may be calculated. Calculated operating parameters may include combustor exit temperature, turbine reference temperature, turbine firing temperature, etc.

Block 210 is then invoked to detect when one or more of the monitored operating parameters meets or exceeds (e.g., rises above or falls below) a threshold for that operating condition. In an example embodiment of the invention the threshold is associated with a decrease in the exit temperature of the combustor and/or an increase in CO or UHC emission levels of the turbine. If no monitored operating parameter is detected as meeting or exceeding the threshold, then monitoring of the operating parameter continues in block 205. However, if one or more monitored operating parameters are detected as meeting or exceeding the threshold associated with a decrease in the exit temperature of the combustor and/or an increase in CO or UHC emission levels of the turbine, then block 215 is invoked. In example embodiments of the invention, when one or more monitored operating parameters are not within an acceptable operating range, then the control unit may provide an indication to a user interface indicating that an operator may cause one or more variable orifices in one or more of the compressor stages in the turbine system to alter one or more extraction air flows from the compressor of the turbine system to decrease the air entering the combustor of the turbine system. In an alternative embodiment of the invention, the control unit may, based on preprogrammed logic, automatically cause one or more variable orifices in one or more of the compressor stages in the turbine system to alter one or more extraction air flows from the compressor of the turbine system to decrease the air entering the combustor of the turbine system.

When block 215 is invoked, the control unit may cause one or more variable orifices in one or more of the compressor stages in the turbine system to alter one or more extraction air flows from the compressor of the turbine system to decrease the air entering the combustor of the turbine system. Next, block 220 may be invoked to determine if one or more monitored operation conditions are back within an acceptable operation range. If the one or more monitored operating parameters are not within an acceptable operating range, the control unit may maintain the extraction air flow rate from the compressor of the turbine system, or the control unit may cause additional variable orifices in one or more of the compressor stages in the turbine system to increase the extraction air flows (or air flow rates) from the compressor of the turbine system. If the one or more monitored operating parameters are within an acceptable operating range, then the example process shown in FIG. 2 ends.

The example process elements of FIG. 2 are shown by way of example, and other process and flow embodiments can have fewer or greater numbers of elements, and such elements can be arranged in alternative configurations in accordance with other embodiments of the invention.

Example embodiments of the invention can provide the technical effects of improving turn down capability of a combustion turbine engine by utilizing variable compressor extraction flows (via one or more variable compressor extraction orifices) in one or more compressor stages of a turbine system during load reduction in order to maintain a suitable fuel/air ratio to meet desired combustor operating parameters. In this regard, example embodiments of the invention can provide the technical effects of managing the load reduction for a gas turbine generator while maintaining low emissions levels, which may improve fuel consumption of the turbine system operating at any given load level.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for controlling compressor extraction air flows from a compressor of a turbine system during turn down, the method comprising:
monitoring, by a control unit, a combustor exit temperature of a turbine system;
detecting, by the control unit, the combustor exit temperature is below a threshold, wherein the threshold is associated with a decrease in the exit temperature of the combustor;
in response to detecting the combustor exit temperature is below the threshold, increasing the combustor exit temperature by transmitting a control signal to at least one variable orifice located in the turbine system causing the at least one variable orifice to alter at least one extraction air flow from the compressor, wherein prior to transmitting a control signal to at least one variable orifice located in the turbine system: transmitting to a user interface an indicator that the combustor exit temperature is below the threshold, and receiving, from the user interface, instructions to adjust at least one variable orifice located in the turbine system;
detecting that at least one additional operating parameter is operating in a predetermined operating range; and
based on the detection causing at least one additional variable orifice to increase the extraction air flow from the compressor.

2. The method of claim 1, further comprising redirecting the at least one compressor extraction air flow into a portion of the turbine system.

3. The method of claim 2, wherein the redirection of the at least one compressor extraction air flow includes redirecting the at least one compressor extraction air flow into an exhaust diffuser or into the atmosphere.

4. The method of claim 1, further comprising monitoring, by the control unit, at least one operating parameter of the turbine system, wherein the at least one operating parameter includes at least one measured operating parameter, wherein the at least one measured operating parameter comprises an exhaust temperature, a compressor airflow rate, a compressor discharge temperature, a compressor discharge pressure, a fuel flow rate, a carbon monoxide emission level, or an unburned hydrocarbon emissions level.

5. The method of claim 1, further comprising monitoring, by the control unit, at least one operating parameter of the turbine system, wherein the at least one operating parameter includes at least one calculated operating parameter, wherein the at least one calculated operating parameter comprises a combustor exit temperature, a turbine reference temperature, or a turbine firing temperature.

6. The method of claim 1, further comprising monitoring, by the control unit, at least one operating parameter of the turbine system, wherein detecting the at least one operating parameter meeting or exceeding a threshold comprises:
measuring or calculating at least one operating parameter value; and
comparing the at least one operating parameter value to a threshold value.

7. The method of claim 1, wherein the control signal causing the at least one variable orifice to alter at least one extraction air flow from the compressor results in a decrease in a mass flow rate of air entering the combustor of the turbine system.

8. The method of claim 1, wherein the at least one variable orifice located in the turbine system comprises a plurality of variable orifices located in at least one stage of extraction piping associated with the compressor.

9. The method of claim 1, wherein the at least one variable orifice comprises at least one valve, and wherein the control signal causing the at least one variable orifice to alter at least one extraction air flow from the compressor comprises a control signal causing an adjustment to a valve stroke of the at least one valve.

10. A control system for controlling compressor extraction air flows from a compressor of a turbine system during engine turn down comprising:
a plurality of sensors located in a turbine system;
a control unit processor in communication with the plurality of sensors, wherein the control unit processor is configured to execute computer-implemented instructions to:
monitor, by a control unit, a combustor exit temperature of a turbine system;
detect, by the control unit, the combustor exit temperature is below a threshold, wherein the threshold is associated with a decrease in the exit temperature of the combustors;
in response to detecting the combustor exit temperature is below the threshold, increasing the combustor exit temperature by transmitting a control signal to at least one variable orifice located in the turbine system causing the at least one variable orifice to alter at least one extraction air flow from the compressor, wherein prior to transmitting a control signal to at least one variable orifice located in the turbine system: transmitting to a user interface an indicator that the combustor exit temperature is below the threshold, and receiving, from the user interface, instructions to adjust at least one variable orifice located in the turbine system;

detect that at least one additional operating parameter is operating in a predetermined operating range; and based on the detection causing at least one additional variable orifice to increase the extraction air flow from the compressor.

11. The system of claim 10, wherein the control unit processor is further configured to execute computer-implemented instructions to redirect the at least one compressor extraction air flow into a portion of the turbine system.

12. The system of claim 11, wherein the computer-implemented instructions to redirect the at least one compressor extraction air flow comprise computer-implemented instructions to redirect the at least one compressor extraction air flow into an exhaust diffuser or into the atmosphere.

13. The system of claim 10, further comprising monitoring, by the control unit, at least one operating parameter of the turbine system, wherein the at least one operating parameter includes at least one measured operating parameter, wherein the at least one measured operating parameter comprises an exhaust temperature, a compressor airflow rate, a compressor discharge temperature, a compressor discharge pressure, a fuel flow rate, a carbon monoxide emission level, or an unburned hydrocarbon emissions level.

14. The system of claim 10, further comprising monitoring, by the control unit, at least one operating parameter of the turbine system, wherein the at least one operating parameter includes at least one calculated operating parameter, wherein the at least one calculated operating parameter comprises a combustor exit temperature, a turbine reference temperature, or a turbine firing temperature.

15. The system of claim 10, further comprising monitoring, by the control unit, at least one operating parameter of the turbine system, wherein the computer-implemented instructions to detect the at least one operating parameter meeting or exceeding a threshold comprise measuring or calculating at least one operating parameter value, and comparing the at least one operating parameter value to a threshold value.

16. The system of claim 10, wherein the control signal causing the at least one variable orifice to alter at least one extraction air flow from the compressor results in a decrease in a mass flow rate of air entering the combustor of the turbine system.

17. The system of claim 10, wherein the at least one variable orifice located in the turbine system comprises a plurality of variable orifices located in at least one stage of extraction piping associated with the compressor.

18. The system of claim 10, wherein the at least one variable orifice comprises at least one valve, and wherein the control signal causing the at least one variable orifice to alter at least one extraction air flow from the compressor comprises a control signal causing an adjustment to a valve stroke of the at least one valve.

* * * * *